May 26, 1970     R. T. McKIE     3,514,281
PRODUCTION OF PYRITE AND/OR SULFURIC ACID AS BY-PRODUCT
OF COPPER SMELTING PROCESS
Filed Jan. 11, 1968
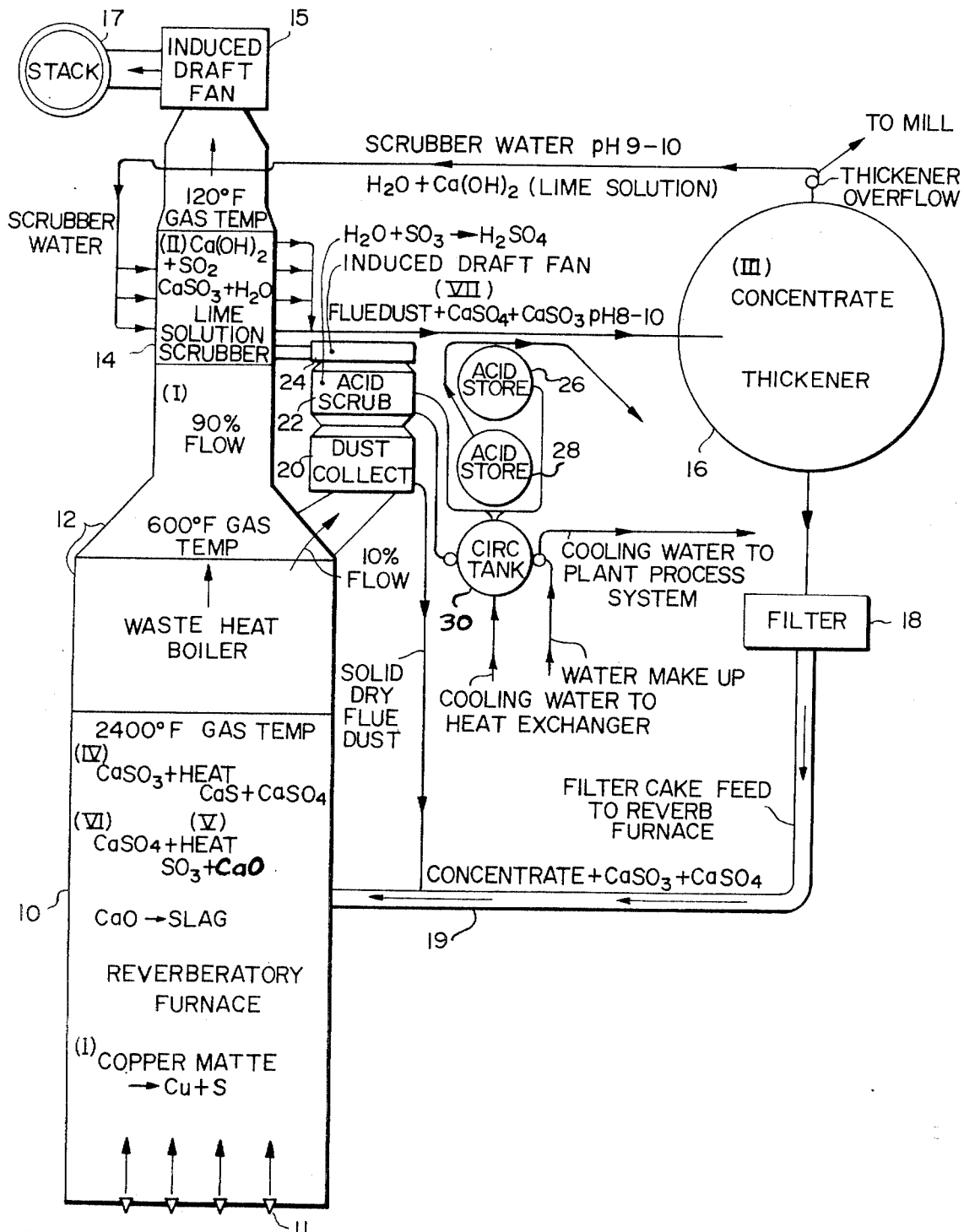
INVENTOR.
Robert T. McKie
BY
Morse, Altman + Oates
ATTORNEYS

United States Patent Office 3,514,281
Patented May 26, 1970

3,514,281
PRODUCTION OF PYRITE AND/OR SULFURIC ACID AS BY-PRODUCT OF COPPER SMELTING PROCESS
Robert T. McKie, Marenisco, Mich., assignor to Copper Range Company, New York, N.Y., a corporation of New York
Filed Jan. 11, 1968, Ser. No. 697,195
Int. Cl. C22b *15/04;* C01b *17/52*
U.S. Cl. 75—73
6 Claims

ABSTRACT OF THE DISCLOSURE

During extraction of copper from sulfide ore, smelter reverberatory smoke, which ordinarily is discarded as waste, is treated by a high efficiency multi-stage wet dust scrubber operating with an alkaline solution of lime, in order to produce, as a useful by-product, a sulfide matting agent and sulfuric acid or sulfuric acid only.

BACKGROUND OF THE INVENTION

The present invention relates to metallurgical processes and, more particularly, to copper production and by-products thereof.

The greater proportion of all copper is obtained from sulfide ores such as chalcocite-$Cu_2S$, covellite-$CuS$, chalcopyrite-$CuFeS_2$, bornite-$Cu_5FeS_4$ and enargite-$Cu_3$ (As, Sb)$S_4$. Typically in extracting the copper, the processing steps include: flotation to yield a concentrate; roasting to lower the sulfur content and optionally mixing with raw concentrate to obtain a desired sulfur content; and smelting in a reverberatory furnace under conditions such that copper oxide reacts with iron sulfide (originally present or added as flux) to form copper sulfide and iron oxide, the copper sulfide forming a molten solution called copper matte and the iron oxide forming a slag with an added oxide such as silica; whereby conversion of the copper matte may be effected by reaction with oxygen (air) to produce copper and to oxidize sulfur to $SO_2$ which passes off as a gas, thereby leaving copper for separation and casting. Heretofore, the sulfur dioxide of the reverberatory smoke has been discarded as waste. The present invention contemplates a process in which such sulfur is converted to a sulfide matting agent and sulfuric acid or to sulfuric acid only.

SUMMARY OF THE INVENTION

The primary object of the present invention is to provide a copper production process in which sulfur dioxide in copper smelter reverberatory smoke is converted to a sulfide matting agent and/or sulfuric acid by operation of a high efficiency multi-stage wet dust scrubber having an alkaline solution of lime or finely divided calcium carbonate slurry as the scrubbing liquid. Certain steps of the process are performed by existing components of a typical sulfide copper processing system. In the illustrated embodiment, the matting agent serves to recharge the system and the sulfuric acid is available as a byproduct.

Other objects of the present invention will in part be obvious and will in part appear hereinafter.

The invention accordingly comprises the process characterized by the steps, conditions, concentrations and relationships that are exemplified by the following detailed disclosure, the scope of which will be indicated in the appended claims.

BRIEF DESCRIPTION OF THE DRAWING

For a fuller understanding of the present invention, reference is to be had to the accompanying drawing wherein:

The figure is a flow diagram of an illustrative process of the present invention.

DETAILED DESCRIPTION

Referring to the figure in accordance with the present invention, copper ore is concentrated and roasted, as described above under Background Of The Invention. Thereafter, the preferred process of the present invention occurs, as shown in the drawing, in accordance with the following components shown in Arabic numerals and the following stages shown in Roman numerals. The resulting concentrate serves as a charge in a reverberatory furnace 10, which typically is maintained at a temperature of 2400° F. by burners 11. In reverberatory furnace 10, smelting occurs under conditions such that copper oxide reacts with iron sulfide (originally present or added as a flux) to form copper sulfide and iron oxide. The copper sulfide forms copper matte. In accordance with the present invention, as a result of burning some of the contained sulfur, sulfur dioxide as at (I) from the reverberatory furnace charge leaves furnace 10 in a smoke accompanied by the fuel combustion gases and dust as at 12. The major portion of this dust laden 600°F. smoke, say 90% by weight, is received by a main scrubber 14 where the dust and $SO_2$ are scrubbed out by an aqueous lime solution. The gas flow is established by a fan 15 and a stack 17. The resulting reaction involving sulfur dioxide precipitates calcium sulfite as at (II) at a pH of 9 to 11 in accordance with the following formula:

$$Ca(OH)_2 + SO_2 \rightarrow CaSO_3 + H_2O \qquad (1)$$

The $CaSO_3$ precipitate, together with copper bearing flue dust is returned to a concentrate thickener 16 and thence to a filter 18 where it becomes a small fraction of the concentrate filter cake. Scrubber water at a pH of 9 to 11, i.e. $Ca(OH)_2$ and $H_2O$ is returned to main scrubber 14 from concentrate thickener 16. This concentrate filter cake as it (III) in the illustrated process if fed as at 19 to reverberatory furnace 10 where it displaces an equivalent amount of the normal lime (CaO) flux. In the reverberatory furnace, the $CaSO_3$ reacts as at (IV) to form calcium pyrite (CaS) and calcium sulfate ($CaSO_4$) in accordance with the following formula:

$$4\ CaSO_3 + 600°\ C.\ heat \rightarrow CaS + 3\ CaSO_4 \qquad (2)$$
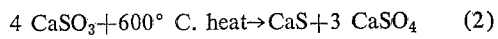

The resulting calcium pyrite as at (V) thus becomes available for reaction with free and oxidized (cuprite) copper to form calcocite ($Cu_2S$) which becomes part of the matte in accordance with the following formulas:

$$2Cu + CaS + \tfrac{1}{2}O_2 \rightarrow Cu_2S + CaO \qquad (3)$$
$$Cu_2O + CaS \rightarrow Cu_2S + CaO \qquad (4)$$
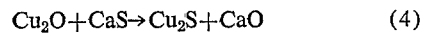

The $CaSO_4$ upon heating to 2400° F. (above 1832° F.) in the reverberatory furnace reacts as at (VI) in accordance with the following formulas:

$$CaSO_4 + SiO_2 \rightarrow CaSiO_3 + SO_3 \qquad (5)$$
$$CaSO_4 + Al_2O_3 \rightarrow CaAl_2O_4 + SO_3 \qquad (6)$$
$$CaSO_4 + heat \rightarrow CaO + SO_3 \qquad (7)$$
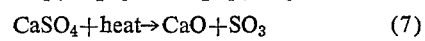

In the foregoing procedure, recharging as at (VII) in effect increases the $SO_3$ concentration of the flue gas.

OPERATIVE EXAMPLE I

To manufacture sulfuric acid, a portion, say 10% of the flue gas is passed, in sequence, through a dry high efficiency dust collector 20 and a subsidiary scrubber 22. Collector 20, for example, contains a dry filter media such as Teflon cloth and scrubber 22 contains sulfuric acid. In subsidiary scrubber 22, $SO_3$ is absorbed to form sulfuric acid ($H_2SO_4$). The gas effluent from scrubber 22 is flowed by a fan 24 to main scrubber 14 where residual $SO_2$ is captured. The liquid residue is aqueous sulfuric acid. In order to increase the concentration of this sulfuric acid before storage in suitable containers 26, 28, a circulation tank 30 recycles the sulfuric acid through subsidiary scrubber 22 for a sufficient period to achieve a 99% concentrated aqueous solution. Compositions typical in this operative example are well known in the art.

OPERATIVE EXAMPLE II

In an alternative smelter, where no free copper or copper oxide exists, the CaS is oxidized so as to liberate $SO_2$, which is recycled as above to form sulfuric acid.

CONCLUSION

The illustratesd process thus provides an improvement in efficiency by utilizing gaseous effluents economically in order to produce added matting agent to a reverberatory furnace and to produce sulfuric acid as a useful byproduct. Since certain changes may be made in the foregoing disclosure without departing from the present invention, it is intended that all matter described in the foregoing specification or shown in the accompanying drawing be interpreted in an illustrative and not in a limiting sense.

What is claimed is:

1. In the sulfide copper smelting process, wherein a sulfide copper concentrate is reacted at elevated temperature in a reaction vessel to produce a copper sulfide matte, a barren slag, and a byproduct oxidic sulfur gas, the improvement comprising reacting said oxide sulfur gas with lime solution to produce a calcium sulfite concentrate, feeding said concentrate to said reaction vessel in order to provide additional sulfur for the copper sulfide matte.

2. In the sulfide copper processing system of claim 1, the steps in which the lime solution is applied to said oxidic sulfur gas via a wet gas scrubber.

3. In the sulfide copper processing system of claim 1, the steps in which said oxidic sulfur gas is sulfur dioxide.

4. In the sulfide copper smelting process wherein a sulfide copper concentrate is reacted at elevated temperature in a reaction vessel to produce a copper sulfide matte, a barren slag, and a byproduct oxidic sulfur gas, the improvement comprising reacting said oxidic sulfur gas with a lime solution to produce a calcium sulfite concentrate, feeding said concentrate to said reaction vessel in order to produce gaseous sulfur trioxide, removing said gaseous sulfur trioxide from said reaction vessel, and absorbing said sulfur trioxide with dilute sulfuric acid to produce additional sulfuric acid.

5. In a sulfide copper processing system, the steps of reacting oxygen with sulfide copper matte in a main reaction vessel, at an elevated temperature, to produce copper and a smoke containing sulfur dioxide, reacting said sulfur dioxide with aqeuous calcium hydroxide to produce calcium sulfite, feeding said calcium sulfite to said reaction vessel in order to produce calcium sulfide and calcium sulfate, decomposing said calcium sulfate in said reaction vessel to calcium oxide and sulfur trioxide, and absorbing said sulfur trioxide with dilute sulfuric acid to form additional sulfuric acid.

6. In the sulfide copper processing system of claim 5, where alkaline solution is finely divided calcium carbonate slurry.

References Cited

UNITED STATES PATENTS 1,892,999   1/1933   Ralston et al. _____ 23—167

FOREIGN PATENTS 365,090   1/1932   Great Britain.

OTHER REFERENCES

Zawadzki, Chem. Abstracts, vol. 43, p. 7307f (1949).

OSCAR R. VERTIZ, Primary Examiner

C. B. RODMAN, Assistant Examiner

U.S. Cl. X.R.

23—167, 174